Nov. 4, 1947.        L. P. EVANS        2,430,420
APPARATUS FOR CONTACTING GASES WITH MOVING
PARTICLE FORM SOLID MATERIAL
Filed March 29, 1944
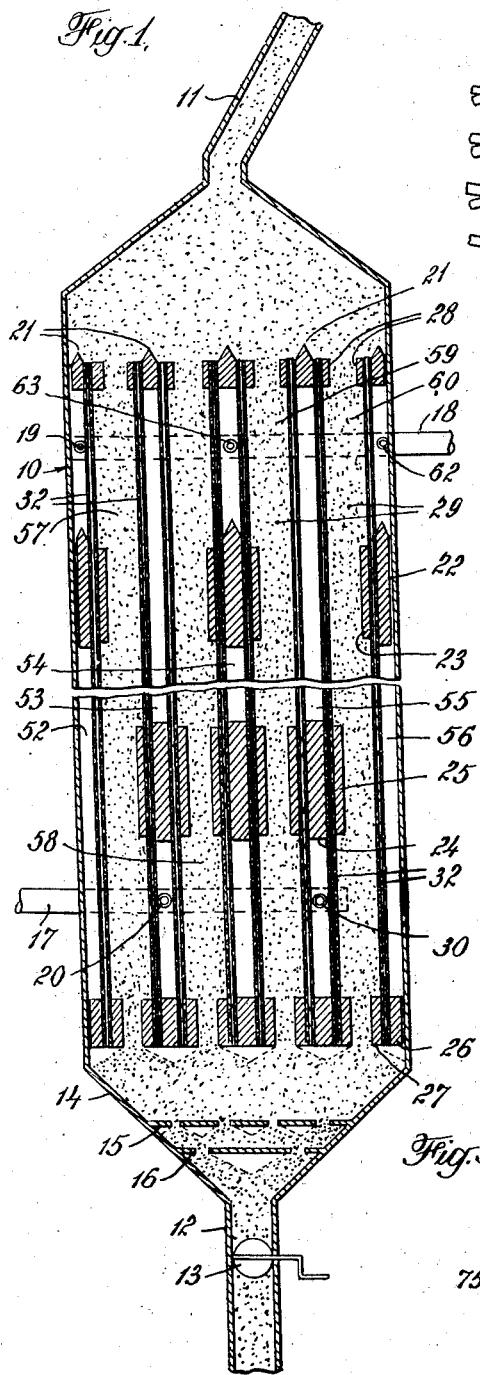
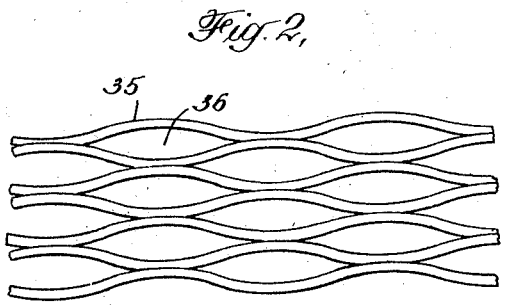
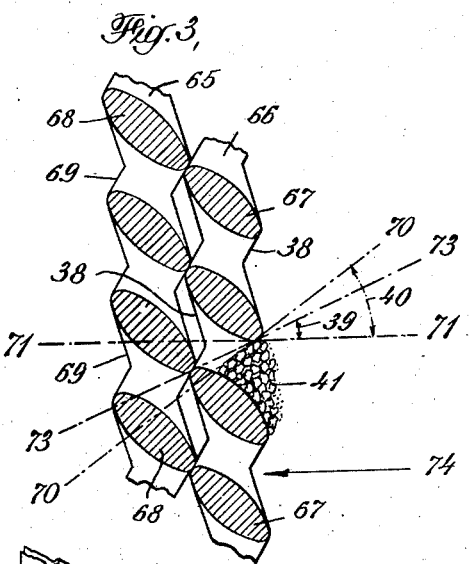
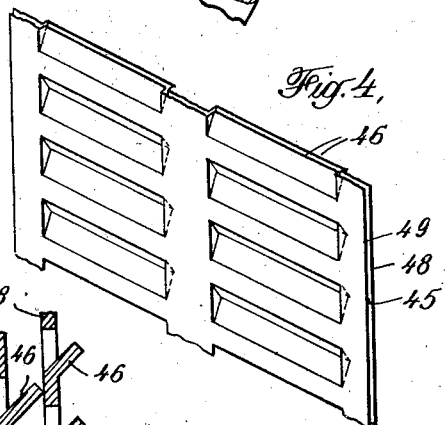
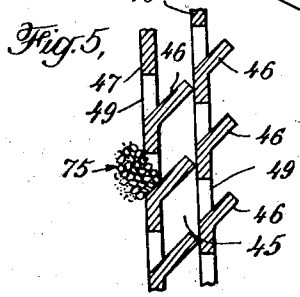
INVENTOR
LOUIS P. EVANS
BY
ATTORNEY Patented Nov. 4, 1947

2,430,420

UNITED STATES PATENT OFFICE 2,430,420

APPARATUS FOR CONTACTING GASES WITH MOVING PARTICLE FORM SOLID MATERIAL

Louis P. Evans, Woodbury, N. J., assignor to Socony-Vacuum Oil Company, Incorporated, a corporation of New York Application March 29, 1944, Serial No. 528,554

4 Claims. (Cl. 23—288)

This invention deals with an apparatus wherein gases may be contacted with particle form solid material for any of a number of purposes such as gas adsorption, gas-solid heat exchange, solid treating or gaseous conversion in the presence of solids which may or may not be catalytic to the desired reaction. Operations, especially of the latter type, are well known to the petroleum industry. Among such processes are the vapor phase catalytic dehydrogenation, alkylation, isomerization, reforming, desulphurization or cracking of hydrocarbon vapors. Typical of these is the cracking conversion of hydrocarbons, it being well known that gas oils boiling at temperatures of the order of 500° F. to 750° F. when passed at controlled temperatures of the order of 800° F. and higher and usually superatmospheric pressures over a particle form solid adsorbent material may be converted into gasoline, gas and other products. A certain amount of cokey material is deposited upon the contact material during the conversion, and this material eventually must be removed in order to maintain the catalyst activity. Contact material used in such processes may partake of the nature of natural or treated clays such as fuller's earth or Super Filtrol or of various synthetic associations of alumina, silica or alumina and silica, any of which may have added constituents such as certain metallic oxides. In a most recent form, the cracking conversion of hydrocarbons has been developed as a process wherein the particle form solid contact mass material is moved cyclically through two zones, in the first of which it is subjected to reaction and in the second of which it is subjected to the action of a fluid regenerating medium such as air, acting to burn off contaminant materials deposited upon the contact mass during reaction. The flow of contact material from either of said zones is throttled to such an extent as to cause the contact material to flow through said zones as a substantially compact column or columns of particle form solid material. In some modifications, gas passage forming baffling is provided in the reaction and regeneration zones in order to facilitate gas flow through the columns of contact material therein. In other modifications gas is distributed across the columns of contact material in the reaction and regeneration zones and caused to flow directly through the closely packed solid material.

This invention has specifically to do with details of construction in connection with reactors and regenerators of this latter type wherein gases are brought into contact with moving columns of particle form contact mass material and subsequently disengaged and withdrawn therefrom. Inasmuch as both reactor and regenerator are alike in this fundamental operation, the term reactor or convertor will hereinafter in the explanation of the invention and in the claiming thereof be used in a sense sufficiently broad to include gas-solid contact apparatus regardless of exact purpose of use.

An important problem which arises in connection with reactors wherein gas is passed through substantially compact flowing masses of particle form solid contact material is that of providing for high gas throughput without seriously disrupting the downward flowing solid material. In order to accomplish this, adequate cross section for gas flow must be provided to limit the linear rate of gas flow below those rates which will create such solid material disruption. Apparatus wherein gases flow radially or horizontally in a direction transverse to that of the solid flow has been one design suggested for such operation. Another suggestion is the provision within the reactor of a plurality of spaced vertical foraminate partitions which divide the reactor into a plurality of parallel spaced gas inlet and outlet spaces having solid material flow passages therebetween. All of these suggested reactors require one thing in common, namely, the provision of solid material retaining partitions between the column of solid material within the reactor and the gas inlet and outlet conduits; and said partitions must be pervious to free flow of gas. It has been found that when ordinary mesh screen partitions are used which have openings smaller than that of the solid material, such screens become gradually plugged and then offer undue resistance to gas flow. It has also been found that partitions may be formed from certain types of screens and louvered sheeting or louvered baffle construction, which provide openings which are larger in size than the solid material particles involved and which are so formed as to prevent normal gravity flow of said solid material therethrough due to its limited surface angle of repose. Properly formed expanded metal screening is a typical example. Such partitions, when used, may effectively retain the solid material under mild operating conditions, without becoming plugged therewith, but under conditions of high rate of gas flow a certain amount of spillage of solid particles from the solid material column into the gas inlet and especially the gas outlet spaces results. In order to prevent excessive loss of solid material from the system in the effluent gas stream and in order to avoid abrasion of the apparatus, it is desirable to limit the amount of such solid material spillage in so far as possible.

It has now been found by experiment that when two of such screens, such as expanded metal screens are juxtaposed together out of phase as regards the openings therein and used in place of a single similar screen as a vertical partition for retaining solid material particles, the spillage of such particles through the partition openings is greatly reduced even under severe operating conditions. The provision of such construction now makes possible the use of reactor designs and gas throughput rates through such reactors which have been heretofore practically infeasible.

A major object of this invention is the provision of an apparatus through which particle form solid may be passed as a substantially compact column and wherein gases may be passed through said column or through portions thereof and subsequently withdrawn therefrom without serious disruption of said solid material flow or without material loss of said solid material particles in the effluent gas.

A specific object of this invention is the provision in reactors or regenerators of the type described of a foraminated partition construction between the solid material flow zones and the gas inlet and/or outlet conduits, which partition construction is simple and compact and which will effectively prevent spillage of solid particles through the openings therein while offering relatively little resistance to gas flow therethrough.

Another object of the invention is the provision of reactors through which relatively high gas throughput rates may be maintained without excessive loss of particle form solids therefrom in the effluent gas.

These and other objects of this invention will become apparent from the following discussion of the invention thereof. In order that the invention may be better understood, reference should now be made to the drawings attached hereto.

Of these drawings Figure 1 is an elevational view, partially in section, of a reactor constructed according to this invention. Figure 2 is a front view of a piece of expanded metal screening of the type used for partitions in the reactor of Figure 1. Figure 3 is an enlarged sectional view of two juxtaposed pieces of the same screening. Figure 4 is a perspective view of an alternate form of foraminate sheeting suitable for partition construction and Figure 5 is an end view showing the proper juxtaposition of two pieces of the sheeting shown in Figure 4. All of these drawings are highly diagrammatic in form.

Turning now to Figure 1, we find the reactor shell 10 having a tapered bottom 14, a bottom outlet conduit 12 with a flow throttling valve 13 thereon and an inlet conduit 11 for contact material at the upper end thereof. Within the tapered drain section are plate partitions 15 and 16 having orifices therein, so spaced as to divide the solid material flow into a number of streams which are then gradualy recombined into a single outlet stream passing downward through the conduit 12. This arrangement provides uniform downward flow of solid material across the entire reactor cross section thereabove. Positioned within the shell 10 are the several horizontally spaced vertical foraminate partitions 32 which extend entirely across the reactor in a direction perpendicular to the plane of the paper. These partitions are supported and spaced by bar and plate members 21—28 inclusive, which also extend across the reactor. Other suitable means of support may alternatively be employed. Defined by these partitions are the gas containing spaces 52 through 56 respectively, and the solid material flow passages therebetween 57 through 60 inclusive. Extending through the reactor shell near the lower end thereof into the gas spaces 53 and 55 are the gas inlet conduits 20 and 30 which connected into the main gas inlet pipe 17 at points outside the reactor. Similarly extending into the gas spaces 52, 54 and 56, near the upper ends thereof, are the gas outlet pipes 19, 62 and 63 which connect into the main gas outlet manifold 18.

Extending entirely across the reactor within the spaces 52, 54 and 56, about one-third of the distance down from the upper ends thereof are the bar or plate members 22, which not only serve to help support the partitions, but also to divide each gas space into two isolated superposed sections. Similar bar or plate members 24 are provided in spaces 53 and 55 about two-thirds the way down from the upper ends thereof. It will be noted that the members 22 and 24 are substantially greater in vertical dimension than the width of adjacent solid material passages so as to force the flow of gas transversely across said passages rather than permitting it to bypass upwardly through the passages around the members 22 or 24 and then back into the original gas space.

In operation, solid material is admitted to the upper end of the reactor 10 through pipe 11 and then passes downwardly therethrough by way of the several passages 57 through 60 inclusive. The solid is prevented from entering the gas spaces at the top thereof by the bar members 21 and from entering the gas spaces from the solid material passages by the special structure of the foraminate partitions, as will be explained hereinafter. The contact material is finally withdrawn from the reactor through pipe 12 at the bottom thereof. The rate of solid material withdrawal through pipe 12 is throttled by valve 13 to such an extent as to cause the solid containing passages in the reactor to be substantially compactly filled with the particle form solid material. The solid material withdrawn from the reactor may then be passed through a suitable regeneration or treating system (not shown) and finally cycled back to the inlet pipe 11 for another passage through the reactor. Reactant gas under proper conditions of temperature and pressure enter the reactor through pipe 17 and pipes 20 and 30 into the lower end of gas spaces 53 and 55. The gas is uniformly distributed in these spaces below the members 24 and passes through the foraminate partitions and through the adjacent contact material filled passages into the gas spaces 52, 54 and 56. It then passes upwardly through these spaces until it is forced by bar members 22 to pass again through the solid material passages, this time between the levels of the bar members 22 and 24 and into the spaces 53 and 55. The gas then makes a final passage through the solid material passages between the levels of the bar members 22 and 21 and enters the upper ends of gas spaces 52, 54 and 56 from which it is withdrawn through pipes 19, 62 and 63 and manifold 18. The gaseous reactants thus withdrawn from the reactor then pass to a fractionation and recovery system (not shown).

A number of modifications of the gas flow arrangements are possible, for example, by omission of the bar members 22 and 24, the gas entering the spaces 53 and 55 will distribute itself along the entire length of said spaces and make only one passage through the adjacent solid material passages into the outlet spaces 52, 54 and 56 from which it is withdrawn. This modification will permit substantially higher gas throughput rates than the apparatus, as shown in Figure 1, but the time of gas contact with the solid material will be substantially less. In other modifications the partitions may be of different length and arranged so as to form groupings of gas spaces of different lengths, some of which extend through two stages of the reaction zone and others of which extend through only one stage.

The reactor shown is intended to be of square or rectangular cross sectional shape but the invention is applicable to reactors of other cross sectional shape provided the partitions are properly modified.

The partitions 32 are of expanded metal construction, each partition consisting of two sheets of expanded metal screening juxtaposed together out of phase as regards the openings therein. In Figure 2 is shown a front view of one layer of expanded metal screen in which 36 represents the openings therein.

In Figure 3 is shown an enlarged sectional view showing the proper juxtaposition of two such expanded metal screens, 65 and 66. The screens should be so arranged that the outside surface of screen 66, rather than that of screen 65, is exposed to the flowing solid material. In the figure the metal part of the screens 66 and 65 are shown as 67 and 68 and the openings therein are shown at 38 and 69, respectively. It will be seen that the openings 38 in screen 66 or the openings 69 of screen 65 are large enough for a solid particle to pass therethrough and that the particle form contact mass material has entered into the space between the two parts of the expanded metal screen 65 and in entry thereinto has followed the law imposed by its own angle of repose to form a surface, the slope of which is shown by the angle 40 between the line 70—70 and the horizontal line 71—71. This angle of repose is that angle which the solid particles will form on the surface of any accumulation of the particle form solid material. This angle will vary somewhat dependent upon the nature and size of the solid particles. The angle of repose of granular clay-type particle form adsorbents has been found to range between about 30 to 40 degrees. This angle may become somewhat less if gas is disengaging from the solid material surface at high velocities. Also shown in Figure 3 is the line 73—73, which is drawn through the opening 38 so as to pass through the upper edge of the opening on the side of the screen facing the solid material and through the lower edge of the opening on the opposite side of the screen. The angle 39 is formed between this line and the horizontal and as long as the angle 39 is less than the angle 40, particle form solid material will not pass through the opening 38. This has been found to be true as long as the solid material is not flowing and there is no gas flow therethrough. When the solid material is permitted to flow downwardly in the passages provided therefor and gas is passed therethrough, a certain amount of spillage of solid particles through the opening 38 will occur if only one vertical screen is used for a partition. Moreover, this spillage may become excessive as the rate of gas flow is increased to levels near but below those required to boil the solid material particles. If, however, two screens are juxtaposed so that when looking along a horizontal line, such as 74—74, through the openings in one screen, the solid metal portion of the second screen will appear projecting across the opposite side of the opening. It is with this meaning that the term juxtaposed out of phase with respect to openings therein will be used in the claiming of this invention.

As a result of this arrangement, the amount of solid material spillage through the screen openings is greatly reduced, while sufficient space for gas flow is left so that the resistance to gas flow through the screens is substantially unchanged. Moreover, since the openings in the screen are of larger size than the solid material, the screen openings will not become plugged. Inasmuch as expanded metal screens may be punched out mechanically from large metal sheets, the cost of construction of partitions made therefrom is relatively low and their installation within a reactor is also relatively simple. Moreover, expanded metal screens have a characteristic strength and rigidity which is lacking in most wire mesh screens thereby requiring less supporting structure within the reactor and at the same time offering better wearing qualities.

The passage defining partitions may be constructed according to this invention from other types of foraminate sheeting such as louvered sheets. Such a louvered sheet is shown in Figure 4 in which sheet, 45, may be seen the upwardly extending louvers 46. An arrangement of two of such sheets according to this invention is shown in Figure 5 wherein are shown sheets 47 and 48, having a number of uniformly spaced louvers or rows of louvers therein. Again it will be seen that the two sheets are juxtaposed together so that the openings 49 in one sheet are horizontally opposite the metal portion of the sheet therebehind. In the arrangement shown, such vertical partitions should be so positioned within a reactor that the exposed surface of the sheet 47 will face the particle form solid material, as shown at 75 in Figure 5.

It should be understood that the details of construction and application of the invention given hereinabove are merely exemplary in nature and are not intended to limit the scope of this invention except as it may be limited by the following claims.

I claim:

1. An apparatus for conducting gaseous conversion in the presence of particle form solid contact material wherein is provided a closed vessel having solid inlet means adjacent its upper end and solid outlet means adjacent its lower end, and within said vessel a plurality of vertical foraminate partitions arranged so as to provide within said vessel at least one gas inlet distributing space with which is associated gas inlet means to said vessel, and at least one gas outlet collecting space with which is associated gas outlet means from said vessel and at least one passage therebetween for said solid material flow, means adjacent the upper ends of the gas inlet distributing space and the gas outlet collecting space arranged to prevent flow of solid material thereinto, characterized by the fact that each of said foraminate partitions are comprised of at least two parallel foraminate sheets juxtaposed together in such fashion as to substantially prevent the fall of said particle-form contact material downwardly between the two sheets and positioned out of phase as regards the openings therein, the openings in each sheet being similarly and uniformly spaced throughout the sheet and each opening being so formed that the minimum linear dimension thereof is greater than the maximum linear dimension of said particle form solid material and so that an imaginary straight line drawn through the upper edge of any opening on the side of the sheet facing the solid material and the lower edge of the opposite side of the sheet makes an angle with the horizontal which is less than the angle of repose of said particle form solid material.

2. An apparatus for conducting gaseous conversion in the presence of particle form solid contact material comprising: a vertical vessel; inlet means at its upper end for admission of said solid material, outlet means at its lower end for withdrawal of said solid, flow control means associated with said outlet means to permit throttling of said solid flow, a plurality of spaced vertical foraminate partitions within said vessel defining a plurality of gas inlet distribution spaces and gas outlet collecting spaces and solid material flow passages therebetween, baffle means adjacent the upper end of said gas inlet spaces and gas outlet spaces to prevent flow of solid material thereinto, inlet conduit means in communication with said gas inlet spaces and outlet conduit means in communication with said gas outlet spaces; each of said foraminate partitions being formed by juxtaposing at least two foraminate sheets together out of phase as regards the openings therein in such a manner as to substantially prevent the solid material particles from falling downwardly between said sheets forming each partition, said openings in said sheets being larger in size than said particles of solid material and being so formed that an imaginary straight line drawn through the upper edge of any opening on the side of the sheet facing the solid material and the lower edge of the opposite side of the sheet makes an angle with the horizontal which is less than the angle of repose of said solid material.

3. An apparatus of the type described for conversion of gaseous hydrocarbons in the presence of a moving particle form solid catalyst comprising: a closed vertical chamber, means to admit said catalyst to the upper end thereof and means to withdraw catalyst from the lower end thereof, flow throttling means associated with said withdrawal means, a plurality of vertical partitions having openings therein extending throughout the major length of said vessel and terminating short of the ends thereof, said partitions serving to provide a plurality of gas inlet distributing spaces and gas outlet collecting spaces and catalyst flow passages therebetween extending substantially the length of said partitions, baffle means adjacent the upper end of said gas inlet and outlet spaces to prevent flow of catalyst thereinto, gas inlet conduit means connected to said vessel in communication with said gas inlet spaces and gas outlet conduit means connected to said vessel in communication with said gas outlet spaces; the gas inlet and outlet spaces being in free gaseous communication with the catalyst passages therebetween through said openings in said partitions, each of said partitions consisting of at least two sheets of expanded metal screening juxtaposed together in such fashion as to substantially prevent catalyst particles from falling vertically between said sheets and said sheets being juxtaposed together out of phase as regards the vertical position of the openings therein, said openings being larger in minimum linear dimension than the maximum linear dimension of said catalyst particles and said openings being so expanded from said sheets that an imaginary line drawn through the upper edge of any opening on the side of a sheet facing the catalyst flow and through the lower edge of said opening on the opposite side of said sheet will form an angle of less than 30 degrees with the horizontal.

4. An apparatus of the type described for conversion of hydrocarbon vapors in the presence of a particle form solid contact mass material comprising: a vertical vessel suitable for confining an elongated conversion zone; means to admit said particle form solid contact mass material to the upper end of said vessel; means to withdraw said solid from the lower end of said vessel; throttle means associated with said solid withdrawal means to permit control of rate of said solid admittance to the upper end of said vessel; within said vessel a plurality of spaced vertical partitions extending throughout a major portion of the length of said vessel and terminating short of the ends thereof; said partitions being so spaced as to provide a pluarity of alternate vertical solid material flow zones and vapor containing zones from which solid flow is substantially excluded, each of said partitions consisting of two sheets of expanded metal screening juxtaposed together so as to substantially prevent the contact material particles from falling downwardly between the sheets, said sheets in each partition being further so juxtaposed together that the openings therein are vertically out of phase, said openings being larger in size than said contact material particles but being so expanded from said sheets that a straight line drawn through the upper edge of any opening on the side of a sheet facing the solid material and through the lower edge of said opening on the opposite side of said sheet forms an angle with the horizontal less than the angle of repose of said solid material; baffle means adjacent the upper end of said vapor containing zones to prevent flow of solid thereinto; vapor inlet conduits near one end of said vessel in communication with certain alternate members of said vapor containing zones and vapor outlet conduits near the opposite end of said vessel in communication with the remaining vapor containing zones, two groups of said zones being thus formed; horizontal partitioning across each member of each of said groups of zones at at least one elevational level between the ends thereof, said partitioning being at different levels in the two groups of zones.

LOUIS P. EVANS.

REFERENCES CITED

The following references are of record in the file of this patent:

UNITED STATES PATENTS

| Number | Name | Date |
|---|---|---|
| 1,995,293 | Clark | Mar. 26, 1935 |

FOREIGN PATENTS

| Number | Country | Date |
|---|---|---|
| 41,572 | Germany | Dec. 5, 1887 |